Oct. 16, 1962     W. PROSKAUER     3,059,215
ELECTRICAL TESTING APPARATUS

Filed Oct. 2, 1959     5 Sheets—Sheet 1

INVENTOR.
WALTER PROSKAUER
BY *Leon F. Herbert*
*Robert W. Dilts*
ATTORNEYS

INVENTOR.
WALTER PROSKAUER

Oct. 16, 1962  W. PROSKAUER  3,059,215
ELECTRICAL TESTING APPARATUS
Filed Oct. 2, 1959  5 Sheets-Sheet 3

INVENTOR.
WALTER PROSKAUER
BY
Leon F. Herbert
Robert W. Dilts
ATTORNEYS

INVENTOR.
WALTER PROSKAUER
BY
ATTORNEYS

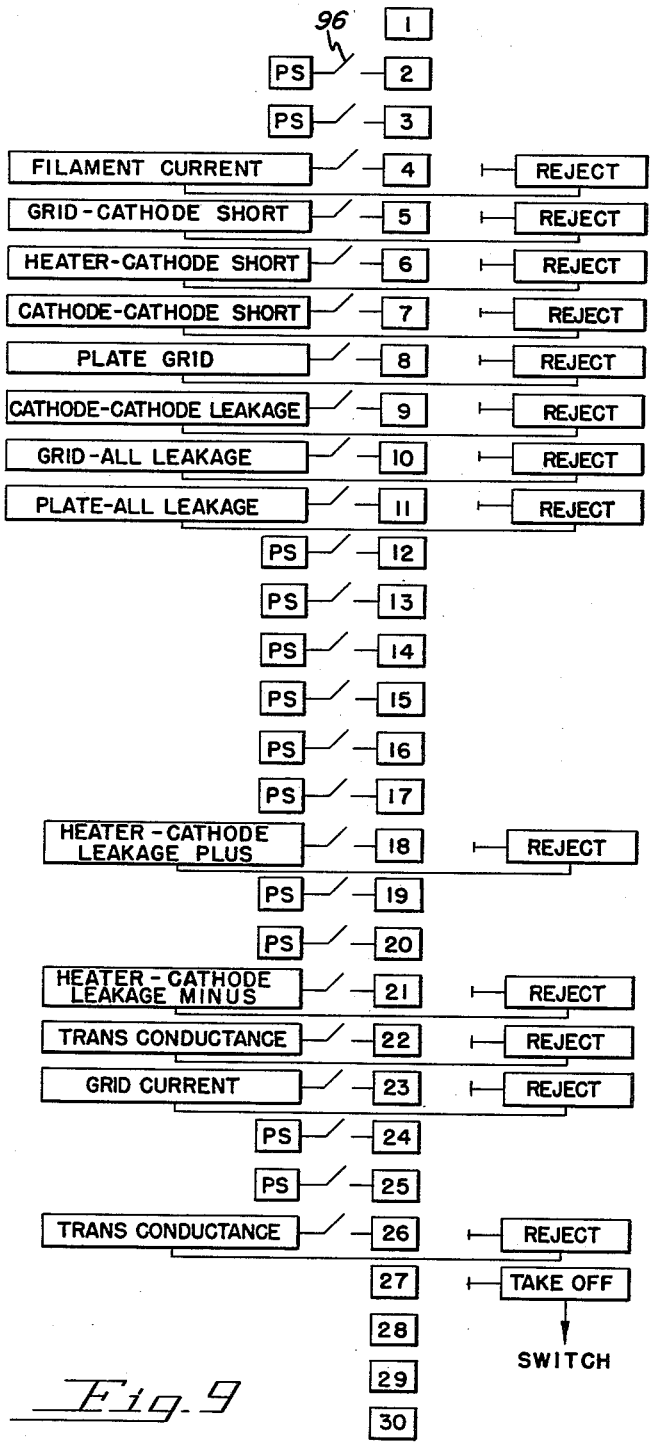
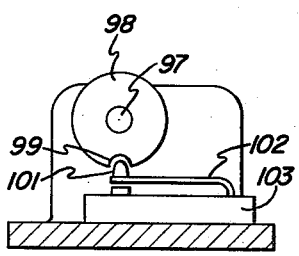
Fig. 10
Fig. 9
INVENTOR.
WALTER PROSKAUER

# United States Patent Office 3,059,215
Patented Oct. 16, 1962

3,059,215
ELECTRICAL TESTING APPARATUS
Walter Proskauer, San Francisco, Calif., assignor to Eitel-McCullough, Inc., San Bruno, Calif., a corporation of California
Filed Oct. 2, 1959, Ser. No. 844,064
2 Claims. (Cl. 339—192)

This invention relates generally to apparatus for automatically testing vacuum tubes.

In the production of vacuum tubes, rigid performance and leakage specifications must be met. For example, the tube must be tested for possible shorts between the various elements, for electrical leakage paths between the various elements, for cathode emission, for transconductance and the like characteristics.

In general, such tests are now manually performed. Either the tests are sequentially performed by a single operator, or the tests are performed successively by a plurality of operators. In any event, it is apparent that such a procedure is not only time consuming, but also relatively expensive.

It is a general object of the present invention to provide an apparatus for automatically testing vacuum tubes.

It is another object of the present invention to provide a testing apparatus for automatically testing, rejecting and classifying tubes which do not meet specifications.

It is a further object of the present invention to provide a testing apparatus in which tubes to be tested are carried on sockets on a rotary table and sequentially indexed to a plurality of individual warm-up and test stations for testing.

It is a further object of the present invention to provide an apparatus of the above character in which means are provided for automatically ejecting defective tubes from the sockets at each of the test stations.

These and other objects of the invention will become more clearly apparent from the following description when taken in conjunction with the accompanying drawing.

Referring to the drawing:

FIGURE 9 is a schematic circuit diagram showing the electrical connections to the various stations; and FIGURE 10 shows a typical cycling switch.

Figure 1:
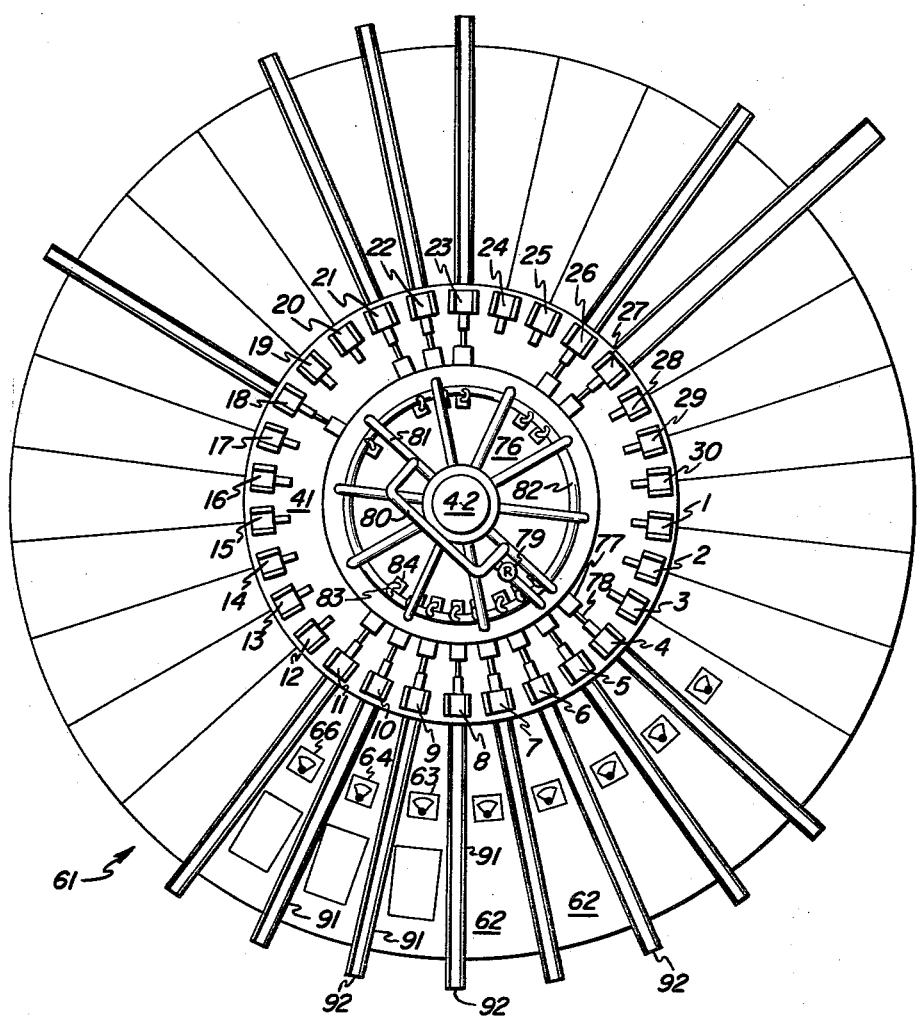
FIGURE 1 is a plan view of an electrical testing apparatus in accordance with the invention.
Figure 2:
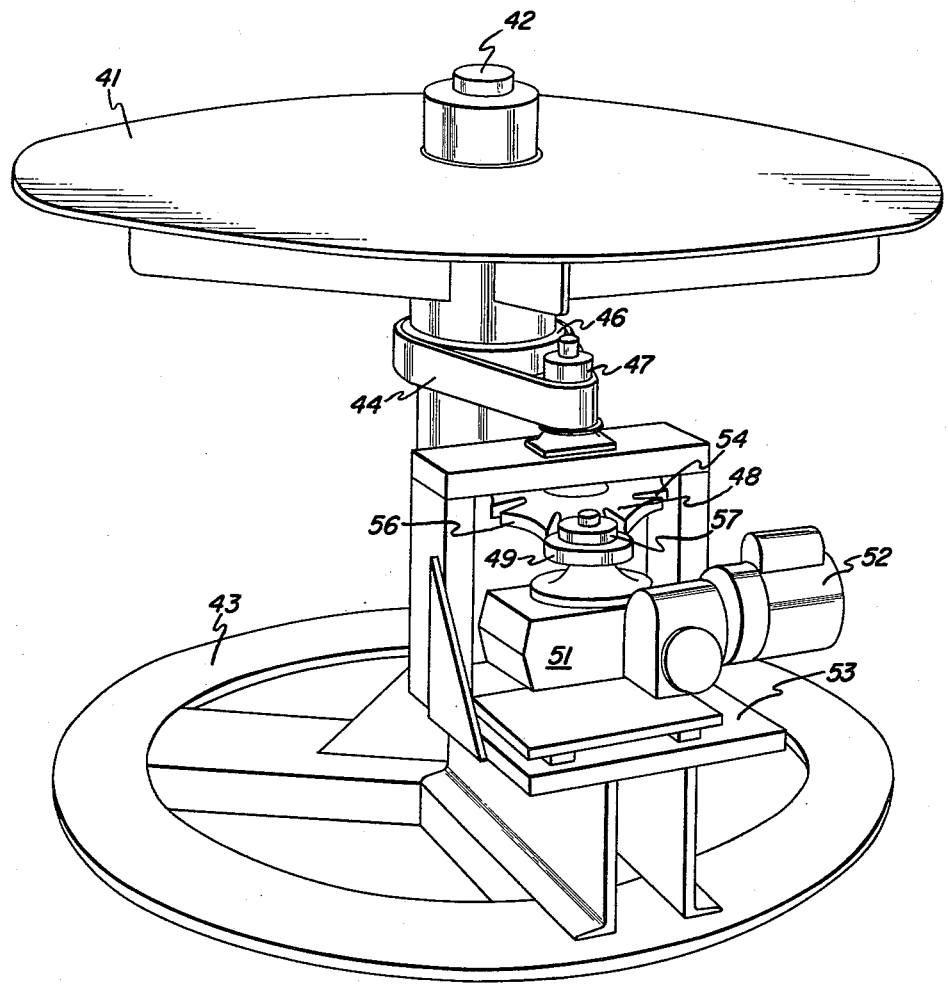
FIGURE 2 is a perspective view showing the rotary index table and drive therefor.
Figure 3:
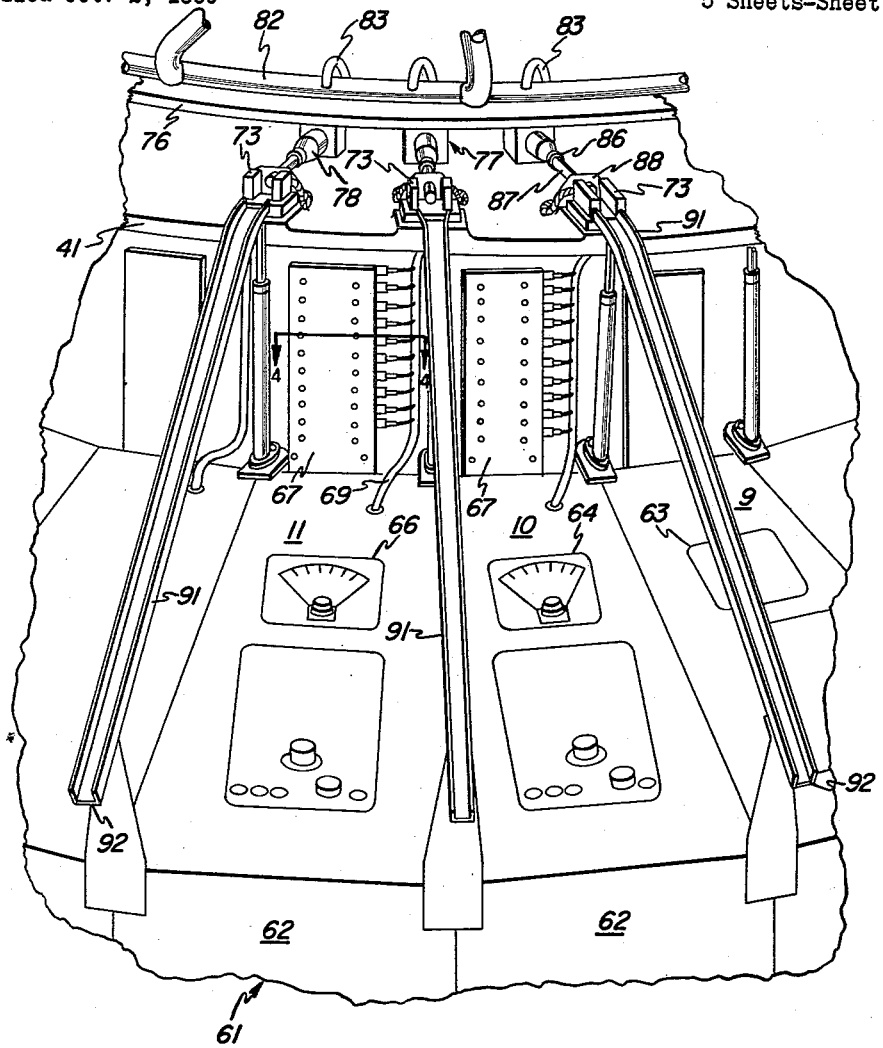
FIGURE 3 is an enlarged view, in perspective, showing a pair of test stations together with reject mechanism and indicating meters.

Referring to FIGURES 1, 2 and 3, a rotary index table 41 is supported on a vertical shaft 42 which is journalled on the base 43. The shaft is driven by a timing belt 44 which engages a shaft pulley 46 and the drive pulley 47 carried by the Geneva wheel 48. The Geneva wheel 48 is engaged by a Geneva drive 49 driven from the gear reduction box 51 powered by a motor 52. The gear reduction box and motor are suitably mounted on the platform 53 supported from the base 43.

As is well known, the Geneva drive includes a pin which engages the slots 54 formed in th Geneva wheel and which serves to drive the wheel through a predetermined angular displacement for each revolution of the drive. The pin engages and drives for a portion of a revolution; then one of the camming surfaces 56 formed on the wheel engages the cam lock 57 on the Geneva drive and the Geneva wheel 54 is locked against further motion until the pin engages the next slot for a new cycle of operation. Geneva wheels are well known. In a particular instance, the Geneva wheel and gear reduction were so selected that the Geneva wheel provided a four second indexing period, that is, a four second drive period and a ten second dwell period at which time the electrical testing in accordance with the invention was performed by the associated apparatus.

A compartmentalized housing 61 which includes a plurality of compartments 62 is disposed about the stationary platform and is adapted to accommodate electrical power supplies, test equipment and other equipment required to control operation of the apparatus and to perform the desired tests. Referring to FIGURES 1 and 3, it is seen that there is a plurality of test stations 1–30. Each of these stations has associated therewith suitable warm-up or testing equipment in the corresponding compartment. For example, stations 9, 10 and 11 (FIGURE 3) include indicating meters 63, 64 and 66, respectively.

Figure 4:
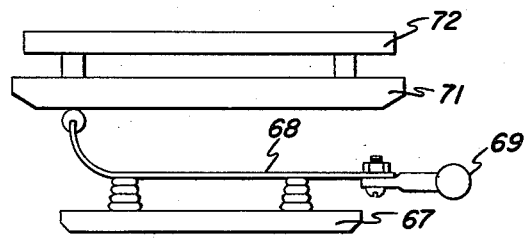
FIGURE 4 is a sectional view taken along the line 4—4 of FIGURE 3 showing the commutating means associated with each of the stations.

A stationary contact stack 67, FIGURES 3 and 4, is mounted adjacent to and below the rotating table 41. The stationary contact stack serves to mount a plurality of finger contacts 68 which are electrically connected to a cable 69. The cable, in turn, connects with the associated electrical apparatus in the compartments. The individual contact fingers 68 are adapted to make contact with the individual commutators 71 carried for rotation below the table by a bracket 72. Each of the commutators 71 is adapted to make electrical connection with a particular terminal of the associated tube socket. Thus, as the turntable 41 is rotated and indexed to a new position, the commutators associated with the respective tube socket come into contact with the adjacent contact stack 67 and electrical contact is formed between the socket and associated equipment.

The plurality of tube sockets 73 is mounted on the rotary table and spaced to correspond to the spacing of the contact stacks 67. Associated with each is a commutator arrangement of the type just described.

A stationary table 76 is disposed above the rotary table 41. The table 76 carries reject mechanisms 77 which are associated with the test stations. The reject mechanisms serve to reject tubes which do not meet the preset specifications for the particular station as will be presently described. The reject mechanisms, may, for example, comprise electromagnetic solenoids or pneumatically operated pistons which are energized to urge the reject piston 78 outwardly. In a particular example, the reject mechanisms were pneumatically operated with the main air pressure supplied from the regulator 79 to the distributing pipe 80 which, in turn, is connected to the pipes 81 and to the circular manifold 82 to which the individual air actuated pistons were connected by means of tubes 83. Control of air to the pistons was by an electromagnetically operated solenoid valve 84.

The reject plunger 86 associated with each of the test station sockets 73 is adapted to be urged radially outwardly by the associated piston 78. The plungers 86 are spring loaded 87 and carried on a bracket 88 to the rear of the asociated tube sockets. Thus, when the piston 78 is actuated, it urges the plunger 86 outwardly against the force of the compression spring to reject a tube in the particular socket. The tube is ejected into the chute 91 and can be collected at the end 92 in a suitable collecting mechanism.

By observing the number of rejects at each of the testing stations, it is possible to correct the production process to increase the number of tubes which meet specifications since one can readily identify the trouble which is occurring in the respective tube.

By way of example, in one particular apparatus, the testing stations 1–30 were as follows:

1—Loading
2 and 3—Filament preheat
4—Filament current test
5—Grid to cathode short test
6—Heater to cathode short test
7—Cathode to cathode short test
8—Plate to grid test
9—Cathode to cathode leakage test
10—Grid to all element leakage test
11—Plate to all element leakage test
12–17—Power preheat
18—Heater to cathode leakage plus test
19 and 20—Power preheat
21—Heater to cathode leakage minus test
22—Transconductance No. 1 test
23—Grid current test
24 and 25—Power preheat, low filament current
26—Transconductance No. 2 test
27—Tube take-off
28–30—Spare stations The various testing circuits may be set to measure a wide range of values. Different tube types can be tested by changing sockets and resetting the circuits. The buss bars connected to each socket limits the number of tube contacts which may be accommodated for a particular machine; however, the number of commutating elements may be changed to accommodate tubes having any number of elements.

Each test circuit indicates its reading on a meter 66. Limit stops form part of the meter and are placed as dictated by the tube specifications. If a reading is greater or less than the allowable range of readings which are acceptable, electrical contact is made with one or the other of the limit stops. This action closes a slave relay or like circuit element which, in turn, activates the pneumatically operated piston 78 to reject the associated tube. As previously described, the tube is urged out of the socket and flows down the chute into a reject bin.

Operation of the testing machine having stations as described above is more clearly understood with reference to FIGURE 9. It is observed that power supplies are associated wtih sockets 2, 3, 12–17, 19, 20, 24 and 25. Each of these power supplies is connected by a switch 96 to the associated tube socket. The switch 96 is a multiple contact switch in which the contacts may be operated by a cam associated with the drive mechanism, or may be the contact of a relay which is controlled by the drive mechanism. For example, the cam arrangement may be of the type shown in FIGURE 10 in which the shaft 97 is driven from the drive mechanism and serves to rotate a cam 98 which includes a notch 99. When the notch 99 registers with the contact button 101 formed on the spring member 102 of the switch 103, the button is lifted thereby activating the switch to close the normally open switch 96 which, in turn, may drive a multi-contact slave relay.

The stations 4–11, 18, 21–23 and 26 each have associated therewith particular testing apparatus. The testing apparatus is suitably connected to the reject mechanism illustrated on the right hand side of the drawing. The take-off mechanism associated with the station 27 is driven from a switch which is activated during each dwell period to remove tubes which have met all of the specifications in the sequence of stations 1–25.

Figure 5:
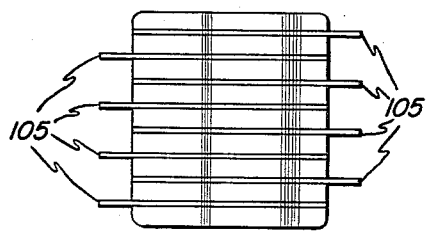
FIGURE 5 is an elevational view showing a typical ceramic tube for testing in apparatus of the present invention.

In one example, a machine was employed to test a ceramic dual triode of the type illustrated in FIGURE 5. The tube includes a ceramic and metal stack sealed to form a vacuum tight envelope. Suitable terminal tabs 105 extend outwardly therefrom and provide means for making electrical connection to the various tube elements.

Figure 6:
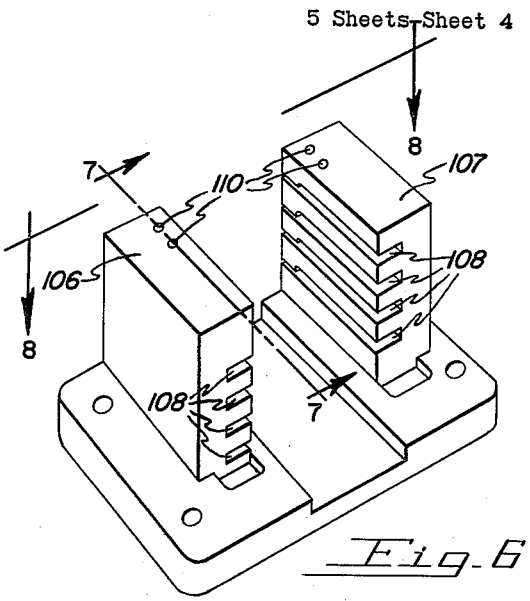
FIGURE 6 is a perspective view of a tube socket for a tube of the type shown in FIGURE 5.
Figure 7:
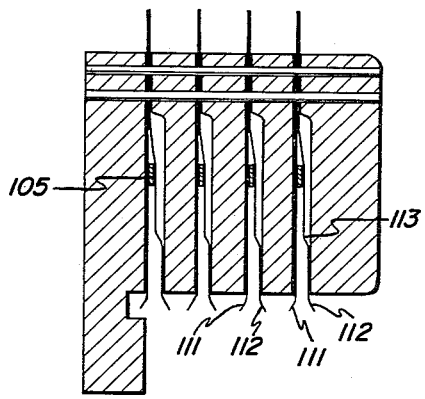
FIGURE 7 is a sectional view taken along the line 7—7 of FIGURE 6.
Figure 8:
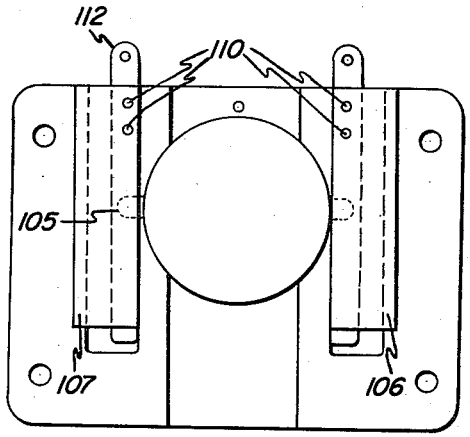
FIGURE 8 is a plan view of the tube socket with a tube inserted.

A socket for accommodating a tube of the type shown in FIGURE 5 is shown in FIGURES 6–8. The socket includes spaced posts 106 and 107 which are rectangular in section. The posts are provided with spaced elongated openings or slots 108 which are adapted to receive spaced spring contact elements 111 and 112. One end of the slots is of reduced spacing and serves to receive and hold the spring contact elements. Pins 110 are adapted to extend through the block and through the contact elements to secure the same. The contact elements are made from straight thin bar spring with the upper element 112 offset or bent at 113 whereby the spring urges against the upper side of the slot and the other end of the spring is urged against the straight spring 111.

The tube tab 105 wipes against the contact element 112 and is guided into the portion of reduced spacing and wedged therein to provide effective electrical contact. The wiping action of the tabs 105 serves to clean the contact as the tube is seated. The spring also serves to compensate for variations in spacing of the tabs 105 in different tubes.

The tubes are placed in the socket by urging the same radially inward. For rejection, an associated plunger contacts the tube and forces the same radially outwardly from the slots 108 into the associated chute.

I claim:

1. An electron tube socket comprising two spaced posts connected at one end to a support member whereby a passageway is formed between the posts, said posts having slots therein substantially parallel to said base and open at one end of said passageway, each of said slots having a contact surface formed along one side of the slot, a flexible contact element facing said one side of the slot, said contact element being in contact with the other side of the slot at the end of said contact element adjacent said open end of the slot, the other end of said contact element being held close to said one side of the slot, and the intermediate portion of said contact element being spaced from and displaceable toward said other side of the slot.

2. An electron tube socket comprising a wall having a slot therein, said slot being open at one end to receive a terminal tab on an electron tube, a contact surface formed along one side of said slot, a flexible contact element facing said one side of the slot, said contact element having a middle portion spaced from and displaceable toward the other side of said slot, the end of said contact element adjacent said open end of the slot being positioned closer to said other side of the slot than said middle portion, and the other end of said contact element being restrained against movement toward said other side of the slot.

References Cited in the file of this patent

UNITED STATES PATENTS

| | | |
|---|---|---|
| 1,808,301 | Ferguson | June 2, 1931 |
| 1,920,662 | Palm | Aug. 1, 1933 |
| 1,983,388 | Moore | Dec. 4, 1934 |